United States Patent [19]

Jones

[11] Patent Number: 4,685,705
[45] Date of Patent: Aug. 11, 1987

[54] LARGE DEFLECTION PIPE COUPLING

[75] Inventor: Lawrence S. Jones, Hueytown, Ala.

[73] Assignee: United States Pipe and Foundry Company, Birmingham, Ala.

[21] Appl. No.: 879,770

[22] Filed: Jun. 27, 1986

[51] Int. Cl.⁴ ............................................. F16L 21/02
[52] U.S. Cl. .................................. 285/177; 285/231; 285/374; 285/369
[58] Field of Search ............... 285/177, 230, 231, 288, 285/374

[56] References Cited

U.S. PATENT DOCUMENTS

| | | | |
|---|---|---|---|
| 1,383,322 | 7/1921 | Marr | 285/177 |
| 2,165,926 | 7/1939 | Greene | 285/177 X |
| 2,448,271 | 8/1948 | McClintock | 285/177 |
| 2,953,398 | 9/1960 | Haugen et al. | 285/110 |
| 3,684,320 | 8/1972 | Platzer et al. | 285/374 X |
| 4,108,481 | 8/1978 | Graham | 285/231 |
| 4,361,336 | 11/1982 | Reeh et al. | 285/55 X |
| 4,480,860 | 11/1984 | Foresta et al. | 285/177 |

FOREIGN PATENT DOCUMENTS

| | | | |
|---|---|---|---|
| 401605 | 5/1966 | Switzerland | 285/177 |
| 1035543 | 7/1966 | United Kingdom | 285/177 |
| 1172404 | 11/1969 | United Kingdom | 285/177 |

*Primary Examiner*—Thomas F. Callaghan
*Attorney, Agent, or Firm*—James W. Grace; Charles W. Vanecek

[57] ABSTRACT

This invention pertains to a pipe joint which allows greater joint deflection by the use of a bell stub between a pair of coupled pipes. The bell stub has a bell contour inside and a plain end contour outside.

8 Claims, 4 Drawing Figures

LARGE DEFLECTION PIPE COUPLING

BACKGROUND OF THE INVENTION

1. Field of the Invention

This invention pertains to the field of pipe joining or coupling, and more particularly to pipe joints which allow greater joint deflection than prior art push-on pipe joints.

The invention relates to connecting pipes using push-on joints wherein an elastomeric seal surrounds the end of one pipe and seals against the inside of the other pipe being joined. Such joining methods are designed to allow a certain deviation from a straight line when any two pipes are joined. Also, when a fitting is joined to a pipe, there can be a deviation from the precise angle intended for the fitting. Such deviation can be multiplied utilizing the present invention.

The invention comprises a pair of pipes coupled together using a "nested" coupling. The end of one pipe is inserted into sealing engagement with an internal coupler, i.e., a bell stub (having a bell contour inside and a plain end contour outside) which is itself inserted into sealing engagement with the bell of a connector or the bell of a pipe. Two plain end pipes can thus be joined in such a manner as to allow four times the joint deflection as a bell and plain end joint would have. Additional "nests" could be utilized to further increase the deflection, or a bell to plain end connection can be made utilizing one bell stub piece to double the normal deflection. Restraining means can also be incorporated into the connection.

Prior art push-on joints can be deflected until the end of the plain end pipe being joined comes into contact with the inside surface of the bell of the outer pipe being joined. Such joints will not deflect further without permanently deforming their shape. A restrained pipe joint of the prior invention is disclosed and claimed in U.S. Pat. No. 3,684,320.

The nested joint of this invention will allow the inner joints to deflect to a maximum and allow the outer joints to deflect likewise. Thus, multiple joint deflections are allowed in an equal length of the pipe line. This is especially useful when traversing uneven terrain where excavating is not possible or cannot be controlled, e.g., when crossing a stream or descending a mountain. It is equally important in an area where considerable soil movement or settling is anticipated such as swamp lands or earthquake-prone areas. Prior art methods are limited to the use of short lengths of pipe or to joints utilizing a ball and socket. Ball and socket joints require expensive machining to close tolerances. The present invention can utilize molded components which are not machined. This is a significant savings especially for ductile iron pipe lines as will be seen in the description of the preferred embodiment of the invention.

SUMMARY OF THE INVENTION

The invention provides a means for joining pipes wherein the deflection normally allowed at the joint can be multiplied. In the case of cast ductile iron pipe, such means can be provided using as cast components. Using the invention, a pipe line can be placed following uneven terrain in both vertical and horizontal directions without the use of conventional fittings. The invention can eliminate the need for expensive machined ball and socket pipe joints, traditionally used when pipe lines cross rivers, and eliminate pipe fittings providing fixed angle bends. Utilizing this invention, a pipe line can be installed without precise trench, excavation or fixed angle fittings. These benefits are achieved by providing an inner coupler, i.e., a bell stub which has on its inside the configuration of a pipe bell and on its outside the configuration of a plain end pipe. As is shown herein, such a member is used to dramatically increase the deflection possible at a pipe joint.

It is an object of the invention to provide a novel means for joining pipes so that the deflection of joined pipes at the pipe joint is greatly amplified compared to prior art push-on pipe joints.

It is another object of the invention to provide a means for joining two pipes with spigot ends, or a pipe with a bell end and a pipe with spigot end in such a manner as to provide for increased deflection in the joint.

BRIEF DESCRIPTION OF THE DRAWING

Other objects and advantages of the present invention will become apparent to those skilled in the art from a consideration of the following detailed description taken in conjunction with the accompanying drawing in which like numerals indicate like elements and in which.

DESCRIPTION OF THE PREFERRED EMBODIMENT

Figure 1:
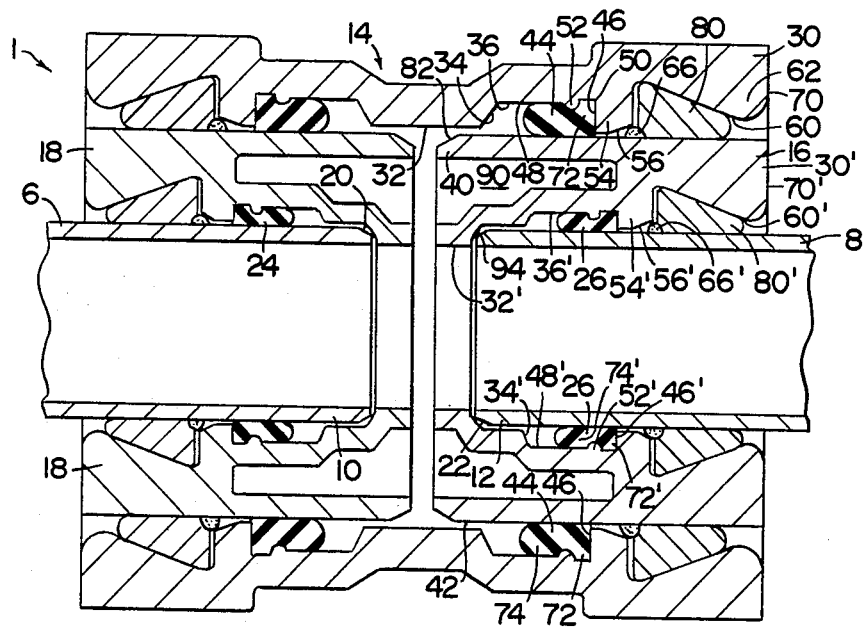
FIG. 1 is a cross-sectional view of a restrained pipe joint showing one embodiment of the invention.

The preferred embodiment of the invention includes a restraining feature known to those of skill in the art and described in U.S. Pat. No. 3,684,320. Such a restraining feature is preferred because of the resolution of forces where a pipe line under pressure changes direction. Referring to FIG. 1, there is shown a cross-sectional view of one of the preferred embodiments of the invention indicated generally by the number 1.

The embodiment of FIG. 1 shows a cross-sectional view of a pipe joint 1 in which two pipes 6 and 8 with plain or spigot ends 10 and 12 respectively are coupled or joined by a pipe connector 14 with intermediate bell stubs 16 and 18 interposed between the pipes 6 and 8 and the pipe connector 14. Pipes 6 and 8, pipe connector 14 and intermediate bell stubs 16 and 18 are tubular in configuration and are coaxially positioned with respect to one another. Thus, pipes 6 and 8 are aligned along a longitudinal center-line and are adapted to be deflected with respect to each other while being held in leak tight confinement within pipe connector 14. Pipes 6 and 8 have a uniform outer circumference over their major length except for a slight bevel at ends 20 and 22 respectively and a bell configuration at their distal ends. The bevels are provided to enable the pipes to be pushed into engagement with sealing gaskets 24 and 26 respectively without tearing the gaskets.

Pipe connector 14 is tubular in configuration with left and right bell cavities. The bell cavities of pipe connector 14 are conventional and correspond to that shown in FIG. 1 of U.S. Pat. No. 2,953,398 as modified by the teachings of U.S. Pat. No. 4,108,481 assigned to the United States Pipe and Foundry Company, and of U.S. Pat. No. 3,684,320, assigned to Tiroler Rohren-und Metallwerke A.G. of Solbad Hall/Tirol, Austria.

In the following description of the embodiment of FIG. 1 of the drawings, only the righthand side of FIG. 1 will be discussed in detail as the lefthand side of the embodiment of FIG. 1 is a mirror image of the righthand side.

The bell end 30 of pipe connector 14 includes an inner barrel 32 of slightly larger inner diameter than the outer diameter of intermediate bell stub 16, included in the joint. Proceeding from the barrel 32 toward the outer end of the bell, there is provided in the bell end 30 a shoulder 32 which serves as the inner end of the bell cavity of pipe connector 14. The interior of bell end 30 is provided with a generally cylindrical inner circumference or annular groove 36 defining the bell cavity of connector 14 and forms an opening for receiving the spigot end 40 of bell stub 16 which has a generally cylindrical outer wall 42. Annular groove 36 is also adapted to receive a gasket 44. Annular groove 36 is defined by front radial wall 46 and rear radial wall or shoulder 34, joined by a third wall 48 substantially axially parallel to barrel 32. Radial wall 46 forms the outer end of the bell cavity, opposite wall 34. Radial wall 46 is substantially perpendicular to axial wall 48 and the two walls form a juncture 50. Projecting inwardly of the wall 48 is an annular protrusion 52. Protrusion 52 acts to position the gasket 44 in the bell cavity of pipe connector 14.

Front radial wall 46 forms one face of a downwardly extending projection 54. Projection 54 has a surface 56 at its lower edge. Surface 56 is inclined at an acute angle upwardly in the direction of the opening of bell end of pipe connector 14. Connected to the upper edge of downwardly directed projection 54 is a wall 60 which inclines downwardly at an angle toward the opening of the bell end of pipe connector 14 and forms the inner face of a circumferential projection 62 whose smallest diameter must be greater than the outer diameter of bell stub 16 by a distance sufficient to permit entry of a weld 66 secured to the outer perimeter of bell stub 16. The bell end of pipe connector 14 terminates in a wall 70 which is generally perpendicular to the longitudinal axis of pipe connector 14.

Gasket 44 is made in accordance with the teachings of U.S. Pat. No. 2,953,398 and generally is composed of elastomeric material having different hardnesses. Gasket 44 is composed of a heel portion 72 and a sealing portion 74. Heel portion 72 is generally of a harder elastomeric material than sealing portion 74. Heel portion 72 of gasket 44 is adapted to fit against axial wall 46 and be held in place by annular protrusion 52. Sealing portion 74 of gasket 44 is compressed between wall 48 of the bell end of pipe connector 14 and the outer perimeter of bell stub 16 to provide a fluid tight joint between pipe connector 14 and the outer perimeter of bell stub 16.

In order to prevent disengagement of pipe connector 14 and bell stub 16, locking segments 80 are inserted between projection 62 and projection 54 of pipe connector 14. Locking segments 80 are metallic elements best shown in U.S. Pat. No. 3,684,320 whose teachings are made a part hereof. A typical locking element 80 is an arcuate metallic segment usually of cast or ductile iron which has the shape of a partial circle whose inner diameter corresponds to the shape of the outer perimeter of bell stub 16. The outer surface of locking segment 80 is shaped as to be complementary to the inner surface of wall 60 of projection 62. A recess or opening (not shown) in wall 70 of pipe connector 14 provides access for insertion of locking segments 80 into their location in the recess formed by projections 54 and 62.

Bell stub 16 has an elongated outer perimeter of uniform diameter throughout its length except for a very short bevel 82 at its left hand terminal end to prevent cutting or tearing of the gasket 44 upon assembly. The shape of the interior portion of bell stub 16 is in the form of a bell cavity corresponding to that just described with respect to pipe connector 14.

The elements of the bell cavity of bell stub 16 corresponding to the elements of the bell cavity of pipe connector 14 are indicated by the same number with a prime mark. In a like manner the elements of gasket 26 which is compressed between bell stub 16 and pipe 8 correspond to the elements of gasket 44 and prime numbers are used to indicate like elements.

The length of bell stub 16 along its axis is designed so that its outer face 70' will be aligned with outer face 70 of pipe connector 14 and the inner end of bell stub 16 will enter into barrel 32 to a point short of the midpoint of pipe connector 14.

A cavity 90 may be formed by removing material in the inner end of bell stub 16 to make the bell stub lighter and to save metal.

Bell stub 16 has a shoulder 94 integrally cast with barrel 32'. Shoulder 94 is in the form of a projection whose inner diameter is less than the outer diameter of pipe 8 so that the shoulder forms an index or stop means to indicate when pipe 8 is inserted the proper distance into bell stub 16.

Bell stub 16 also has a weld or bead 66' extending around its outer periphery at a distance from the inner end of bell stub 16 equal to the distance between an overlapping portion of barrel 32 and the underside of wall 56 of projection 54.

In assembly of pipe 8, bell stub 16 and pipe connector 14, gasket 44 is first placed in the bell cavity of pipe connector 14. Gasket 44 is received against wall 48, annular protrusion 52 and abuts front radial wall 46.

Bell stub 16 is inserted into pipe connector 14 and puhed in so that its inner end lies inside of barrel 32 of pipe connector 14. The relative diameters of the outer periphery of bell stub 16 and the inner face of barrel 32 are such that there is a slight clearance between the bell stub 16 and barrel 32.

As the inner end of bell stub 16 contacts gasket 44 and continues its inward movement, gasket 44 is compressed and sealing portion 74 of gasket 44 forms a fluid-tight seal between wall 48 of pipe connector 14 and the outer periphery of bell stub 16. Bell stub 16 is pushed inwardly of pipe connector 14 until until weld 66 strikes face 56 of protrusion 54 which limits the inward movement of bell stub 16.

Locking segments 80 are inserted into the groove formed by wall 60 of projection 62 and downwardly directed projection 54 through a recess or opening (not shown) in wall 70 and projection 62.

In a like manner, pipe 8 is pushed into bell stub 16 after gasket 26 has been placed in position engaging projection 52' and walls 48' and 46'. As pipe 8 is pushed into bell stub 16, its forward end strikes shoulder 94 of bell stub 16 which serves as an indexing means to indicate proper insertion of pipe 8. Locking segments 80' are inserted between wall 60' of bell stub 16 and the outer circumference of pipe 8 through a recess or opening (not shown) in wall 70' and projection 62'.

Pipe 6 and bell stub 18 are assembled in the left side of pipe connector 14 in the same way as pipe 8 and bell stub 16 are assembled in the right hand side of pipe conector 14.

The deflection of bell stub 16 in pipe connector 14 is additive with the deflection of pipe 8 in bell stub 16, and the deflection of bell stub 18 in pipe connector 14 is also additive with the deflection of pipe 6 in bell stub 18. The total assembly permits greater deflection than the conventional assembly where a two pipes are telescoped into a pipe conector.

Figure 2:
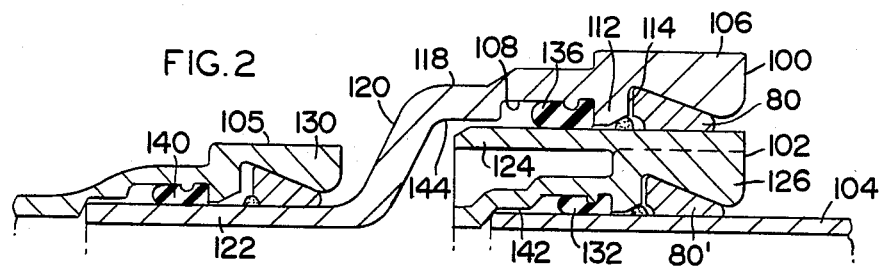
FIG. 2 is a fragmentary cross-sectional view of a restrained pipe joint showing another embodiment of the invention.

Referring now to FIG. 2, there is shown a partial cross-sectional view of another form of the invention. This view shows the top part of two pipes in cross-section with a bell stub and a short pipe connector coupling the two pipes together. In order not to unduly extend the application, it should be understood that the unnumbered elements of FIG. 2 correspond to like elements shown in FIG. 1.

A pipe coupling 100 is employed with bell stub 102 to couple pipes 104 and 105. Pipe coupling 100 has a bell end 106 which is similar in cross-section to the bell end of pipe connector 14 of FIG. 1 including a gasket receiving cavity 108, an inwardly extending projection 112 at one end of gasket cavity 108, a locking segment receiving cavity 114 and an elongated tubular portion 118 integral with and extending away from bell end 106. Tubular portion 118 has a section 120 of diminishing diameter. A section 122 of pipe coupling 100 having a constant external diameter forms an extension of section 120.

Pipe 104 has a plain end having a predetermined external diameter

Bell stub 102 is similar in shape to bell stub 16 shown in FIG. 1 and has a plain end 124 and a bell end 126.

Pipe 105 has a bell end 130 which is similar in shape to bell end 106 of pipe connector 100 or bell end 126 of bell stub 102.

In FIG. 2, gasket 132 is compressed between pipe 104 and bell stub 102, and gasket 136 is compressed between bell stub 102 and pipe connector 100 to form a fluid-tight seal between pipe 104 and pipe connector 100. A gasket 140 is compressed between the outer periphery of pipe connector 100 at its end of narrowest diameter and the inner surface of bell end 130 of pipe 105. Pipe 104 is pushed into the bell cavity of bell stub 102 until it lies below wall 142 of bell stub 102. Bell stub 102 is pushed into the bell cavity of pipe connector 100 until it lies below wall 144 of pipe connector 100.

Figure 3:
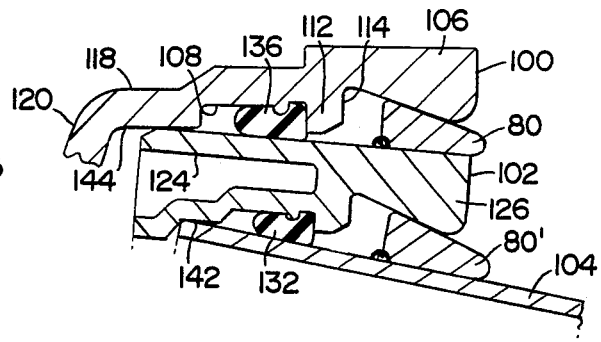
FIG. 3 is an enlarged fragmentary cross-sectional view of a deflected restrained pipe joint employing the invention.

Referring to FIG. 3, there is shown an enlarged fragmentary cross-sectional view of the pipe joint of FIG. 2 in its deflected condition. As can be seen, pipe 104 is deflected at a downward angle with respect to bell stub 102. The downward angle of pipe 104 is limited by radially extending wall 142 of pipe bell 102. Likewise pipe bell 102 is deflected at a downward angle with respect to pipe connector 100. The downward angle of pipe bell 102 is limited by radially extending wall 144 of pipe connector 100. It is thus apparent that the deflection between the pipe 104 and bell stub 102 and deflection between pipe stub 102 and pipe connector 100 are additive. Gaskets 132 and 136 are additionally compressed to ensure a fluid-tight seal under pressure.

Figure 4:
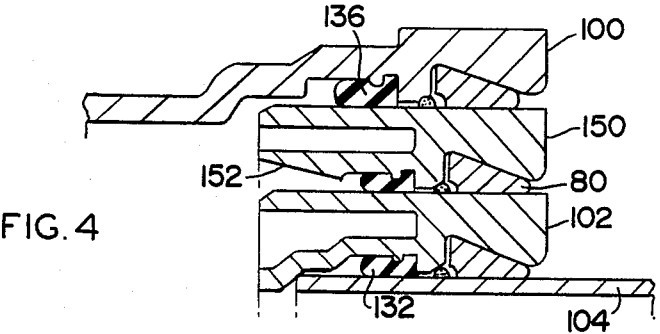
FIG. 4 is a fragmentary cross-sectional view of a pipe joint showing yet another embodiment of the invention.

Referring now to FIG. 4, there is shown an alternative embodiment of the invention. Reference numerals for the various elements will correspond to those used in FIG. 2 with the addition of a second pipe bell 150.

FIG. 4 illustrates a pipe joint which will provide even greater deflection without loss of fluid tightness. In FIG. 4, pipe 104, bell stub 102 and pipe connector 100 correspond to the similarly numbered elements of FIG. 2. If desired, pipe connector 100 may be replaced by the bell end of a second pipe. In addition, there is provided a second bell stud 150 located between bell stud 102 and pipe connector 100. A gasket 154 is provided between bell stub 102 and bell stub 150 to provide a fluid-tight seal therebetween. The configuration of bell stud 150 is generally the same as that of bell stud 102 except that bell stud 150 has a wall 152 interior of its bell cavity. Wall 152 extends inwardly at an acute angle with respect to the plain end of bell stud 102. When the joint of FIG. 4 is deflected, the angular deflection between bell stud 150 and bell stud 102 is greater than that between the other elements of the pipe joint because bell stud 102 can deflect a greater amount because of the inclined angle of wall 152. Thus, in the embodiment of FIG. 4 the deflection of the pipe joint is greater because of the additive effect of the deflection between 104 and bell stud 102, the deflection between bell stud 102 and bell stud 150 and the deflection between bell stud 150 and connector 100.

While the illustrated embodiments show a pipe connector in conjunction with the formation of a pipe joint, a similar joint can be made using only two pipes and a single bell stub therebetween. One of the pipes has a plain end having a longitudinal portion of uniform circumference extending a predetermined distance away from the plain end. The other pipe has a bell end having a bell cavity similar to the bell cavity of connector 100 of FIG. 2. The bell stub is similar to bell stub 16 of FIG. 1. Thus, a pipe joint can be made by pushing the plain end of a bell stub into the bell cavity of one pipe and then pushing the plain end of the second pipe into the bell end of the pipe stub. The gaskets and locking segments shown will be used in the conventional manner.

Under those conditions where the use of locking segments is deemed unnecessary, the locking bell can be shortened by the elimination of circumferential projection 62' (See FIG. 1). In this case, the righthand edge of downwardly directed projection 54 will become the righthand edge of locking segment 16.

The present embodiments of this invention are to be considered in all respects as illustrative and not restrictive, the scope of the invention being indicated by the appended claims.

We claim:

1. A pipe joint comprising a first pipe, a second pipe and a bell stub, said first pipe having a longitudinal portion extending a predetermined distance away form one end of said first pipe, said longitudinal portion having a uniform outer circumference of predetermined diameter, said second pipe having at least one end having an internal bell cavity at one end of said second pipe, said bell stub having a uniform outer circumference of predetermined diameter and at least one end having an internal bell cavity, a portion of said longitudinal portion of said first pipe being enclosed and sealed in said bell cavity of said bell stub and said bell stub being enclosed and sealed in said bell cavity of said second pipe, said longitudinal portion of said first pipe being spaced radially from said bell cavity of said bell stub a sufficient distance to permit angular movement of said longitudinal portion of said first pipe with respect to said bell stub and said bell stub being radially spaced from said bell cavity of said second pipe a sufficient distance to permit angular movement of said bell stub with respect to said bell cavity of said second pipe, whereby said first pipe, said bell stub and second pipe may be offset at an angle with respect to each other.

2. The combination recited in claim 1 in which the entire length of said bell stub member is substantially enclosed in said second pipe.

3. The combination recited in claim 1 in which said second pipe has an end wall and a closure wall determining the inner extent of said bell cavity and the length of said bell stub is greater than the distance between said end wall and said closure wall.

4. The combination recited in claim 1 in which a sealing gasket is fixed between said longitudinal portion of said first pipe and said bell stub and a second sealing gasket is fixed between said bell stub and said bell cavity of said second pipe and in which said bell stub has a locking segment receiving groove and said second pipe has a locking segment receiving groove and a locking element inserted into each of said locking segment receiving grooves whereby said pipes and said bell stub are restrained from disassembly.

5. A pipe joint comprising a first pipe, a second pipe, a first bell stub, a second bell stub and a pipe connector, said first and second pipes each having a longitudinal portion having a uniform outer circumference of predetermined diameter, each of said bell stubs having a uniform outer circumference of predetermined diameter and an internal bell cavity at an end thereof, said pipe connector having a bell cavity at each opposite end thereof, and a portion of said longitudinal portion of said first pipe being enclosed and sealed in said bell cavity of said first bell stub, said first bell stub being enclosed and sealed in one of said bell cavities of said pipe connector, a portion of said longitudinal portion of second pipe being enclosed and sealed in said bell cavity of said second bell stub and said second bell stub being enclosed and sealed in said bell cavity at said opposite end of said pipe connector, said longitudinal portion of said first pipe being radially spaced from said bell cavity of said first bell stub a sufficient distance to permit angular movement of said longitudinal portion of said first pipe with respect to said first bell stub, and said first bell stub being radially spaced from said bell cavity of said pipe connector a sufficient distance to permit angular movement of said first bell stub with respect to said bell cavity of said pipe connector, whereby said first pipe, said first bell stub and said pipe connector may be offset at an angle with respect to each other.

6. The combination recited in claim 5 in which the entire length of each of said bell stubs is substantially enclosed in said pipe connector.

7. A pipe joint comprising a first pipe, a second pipe, a stub bell and a pipe connector, said first pipe having a longitudinal portion extending a predetermined distance from one end of said first pipe, said longitudinal portion having a uniform outer circumference of predetermined diameter, said second pipe having at least one end having an internal bell cavity, said bell stub having a uniform outer circumference of predetermined diameter and having at least one end having an internal bell cavity, said pipe connector having one end having an internal bell cavity and an opposite end having a longitudinal portion extending a predetermined distance from said opposite end, said longitudinal portion having a uniform circumference of predetermined diameter, said first pipe being partially enclosed and sealed in said bell cavity of said bell stub, said bell stub being enclosed and sealed in said bell cavity of said pipe connector and said pipe connector being partially enclosed and sealed in said bell cavity of said second pipe, said longitudinal portion of said first pipe being spaced radially from said bell cavity of said bell stub a sufficient distance to permit angular movement of said longitudinal portion of said first pipe with respect to said bell stub, said bell stub being spaced radially from said bell cavity of said pipe connector a sufficient distance to permit angular movement of said bell stub with respect to said pipe connector and said pipe connector being spaced radially from said bell cavity of said second pipe a sufficient distance to permit angular movement of said pipe connector with respect to said bell cavity of said second pipe, whereby said first pipe, said bell stub, said pipe connector and said second pipe may be offset at an angle with respect to each other.

8. A pipe joint comprising a first pipe, a second pipe, and a first and a second bell stub, said first pipe having a longitudinal portion extending a predetermined distance away from one end of said first pipe, said longitudinal portion having a uniform outer circumference of predetermined diameter, said second pipe having at least one end having an internal bell cavity, each of said bell stubs having a uniform outer circumference of predetermined diameter and at least one end having a bell cavity, a portion of said longitudinal portion of said first pipe being enclosed and sealed in said bell cavity of said first bell stub, said first bell stub being enclosed and sealed in said bell cavity of said second bell stub and said second bell stub being enclosed and sealed in said bell cavity of said second pipe, said longitudinal portion of said first pipe being radially spaced from said bell cavity of said first bell stub a sufficient distance to permit angular movement of said longitudinal portion of said first pipe with respect to said first bell stub, said first bell stub being radially spaced from said bell cavity of said second bell stub a sufficient distance to permit angular movement of said first bell stub with respect to said second bell stub and said second bell stub being radially spaced from said bell cavity of said second pipe to permit angular movement of said second pipe with respect to said second bell stub, whereby said first pipe, said first bell stub, said second bell stub and said second pipe may be offset at an angle with respect to each other.

* * * * *